United States Patent
Milliron (10) Patent No.: US 7,965,294 B1
(45) Date of Patent: Jun. 21, 2011

(54) KEY FRAME ANIMATION WITH PATH-BASED MOTION

(75) Inventor: Timothy S. Milliron, Menlo Park, CA (US)

(73) Assignee: Pixar, Emeryville, CA (US)

(*) Notice: Subject to any disclaimer, the term of this patent is extended or adjusted under 35 U.S.C. 154(b) by 1048 days.

(21) Appl. No.: 11/759,781

(22) Filed: Jun. 7, 2007

Related U.S. Application Data (60) Provisional application No. 60/812,205, filed on Jun. 9, 2006.

(51) Int. Cl.
*G06T 13/00* (2006.01)

(52) U.S. Cl. .......... 345/473; 345/474; 345/475

(58) Field of Classification Search .......... None
See application file for complete search history.

(56) References Cited

U.S. PATENT DOCUMENTS

| | | | |
|---|---|---|---|
| 5,692,117 A * | 11/1997 | Berend et al. | 345/475 |
| 5,883,639 A | 3/1999 | Walton et al. | |
| 2002/0036639 A1 | 3/2002 | Bourges-Sevenier | |
| 2002/0130873 A1 | 9/2002 | Takura et al. | |
| 2004/0012594 A1 | 1/2004 | Gauthier et al. | |
| 2004/0160445 A1 | 8/2004 | Whatmough | |
| 2005/0253849 A1 * | 11/2005 | Reddy et al. | 345/473 |
| 2006/0192783 A1 * | 8/2006 | Kass et al. | 345/473 |
| 2007/0159487 A1 * | 7/2007 | Felt | 345/474 |

OTHER PUBLICATIONS

Milliron et al., "Smart Cars: Driving the Characters in *Cars*," Siggraph, Aug. 2006 (1 page).
U.S. Appl. No. 11/058,724, filed Feb. 14, 2005, Reddy et al.

* cited by examiner

*Primary Examiner* — Ulka Chauhan
*Assistant Examiner* — Donna J Ricks
(74) *Attorney, Agent, or Firm* — Kilpatrick Townsend & Stockton LLP (57) ABSTRACT

Techniques that give animators the direct control they are accustomed to with key frame animation, while providing for path-based motion. A key frame animation-based interface is used to achieve path-based motion.

33 Claims, 7 Drawing Sheets

KEY FRAME ANIMATION WITH PATH-BASED MOTION

CROSS-REFERENCES TO RELATED APPLICATIONS

The present application claims the benefit and priority under 35 U.S.C. 119(e) from U.S. Provisional Application No. 60/812,205 filed Jun. 9, 2006 entitled KEY FRAME ANIMATION WITH PATH BASED MOTION the entire contents of which are herein incorporated by reference for all purposes.

The present application also herein incorporates by reference for all purposes the entire contents of related U.S. application Ser. No. 11/058,724 filed Feb. 14, 2005 entitled CUSTOM SPLINE INTERPOLATION.

BACKGROUND OF THE INVENTION

The present invention relates to computer-generated imagery and animation, and more particularly to animation techniques for using key frame animation controls to achieve path-based animation.

Animation involves the generation of a series of still images that, when played back in quick succession, appear as continuously moving. In computer animation, a rendering process is used to generate a two-dimensional image of a three-dimensional scene from a given viewpoint. Animated sequences can be created by rendering a sequence of the rendered images of a scene as a scene is gradually changed over time. A great deal of effort has been devoted to making the rendered images and the resultant animation realistic.

An object being animated is generally represented by a collection of geometric primitives, mathematical representations, and other information that describe the position, orientation, shape and behavior of the object. A set of animation control channels (also referred to as "animation variables" or "avars") are generally associated with an animated object to facilitate animation of the object. Different values may be assigned to the animation variables at different time points or frames to control the animation of the object. For example, values assigned to the animation variables may specify the pose, including the position and orientation, of the object at different time points (frames) during the animation.

Animation variables that are used to specify the position and orientation of an object comprise translation-related parameters, including $T_x$ (translation in X-axis), $T_y$ (translation in Y-axis), and $T_z$ (translation in Z-axis), and rotation-related parameters, including $R_x$ (rotation in X-axis), $R_y$ (rotation in Y-axis), and $R_z$ (rotation in Z-axis). The values assigned to $T_x$, $T_y$, $T_z$, $R_x$, $R_y$, and $R_z$ at a time point (a frame) define the position and orientation of the object at that time point or frame. The translation-related and rotation-related animation variables are commonly together referred to as the "transformation animation variables" associated with a model for an animated object. Values assigned to transformation animation variables may be used to construct a transformation matrix for posing the animated object Two commonly used animation techniques are "key frame animation" and "path-based animation". In key frame animation, an animator (or user) specifies or authors values for animation variables of an object at different time points or frames. Position and orientation of the animated object may be controlled by specifying values for the transformation animation variables for the object at various frames or time points. For example, an animator may specify that the value for $T_x$ for frame 1 is 0, at frame 5 is 5, at frame 70 is 3, etc. The pair of a time point (expressed as a frame number) and the value specified for that frame is commonly referred to as a "knot" and the frame referred to as a key frame. In key frame animation, the animator specifies the position and orientation for an object being animated by specifying one or more knots for one or more transformation animation variables associated with the object. Knots for each animation variable are specified independently of knots for other animation variables. Accordingly, knots for $T_x$ are specified independent of knots for $T_y$, and so on.

Once one or more knots have been specified for an animation variable at specific key frames, the animation system uses the specified knots to calculate intermediate values for the animation variable for the other time points (frames) for the duration of the animation. An interpolation technique (e.g., a spline function) is typically used to determine the in-between values for the animation variable based upon the knots specified by the animator. For example, if knots are specified for $T_z$ at frames 10 and 25 and if the duration of the animation is 100 frames, then an interpolation function is used to find values for the other frames for $T_z$ up to frame 100 based upon the values specified for frames 10 and 25. Different interpolation functions may be used including linear, cubic, B-spline, Bezier spline, Cardinal spline, Catmull-Rom splines, etc. The spline curve that is determined for the animation variable may pass through the specified knots.

In key frame animation, the interpolated spline for each animation variable for an object is calculated independently from splines for other animation variables for the object. In other words, the spline for an animation variable is generated based upon knots specified for that animation variable and is independent of knots specified for other animation variables associated with the same object. For example, the interpolation spline for $T_x$ is determined independently from the interpolation spline for $T_y$ or R. Accordingly, splines for the translational and rotational animation variables are animated independently with key-framed animation splines.

Animators like to use key frame animation to specify animation for an object because it gives them direct control of the animation variables for the object. Specifying a knot allows an animator to pin down both a time (frame) and a value of the animation variable at that time, thus allowing direct control of the animation variable. Animating the transformation animation variables for an object in this way pins down the object's position and orientation at specified key frames. Since the knots for each animation variable are specified independent of other animation variables and the spline for each animation variable is calculated independent from other animation variable splines, each animation variable can be independently controlled thereby giving the animator a great deal of control over the animation. For example, to pose an object, the animator may specify knots independently for the translation and rotation parameters and thereby control the animation.

However, the independent control of each animation variable provided by key frame animation is not always suitable for animating complex motions for an object where various motions and positions of the object have to be synchronized. For example, for animating a car driving along a path and changing orientation as it drives, controlling the translation and rotation animation variables independently using key frame animation is complicated and results in motion that does not look very realistic. The car appears to "skid"—which does not create a realistic animation effect for the car's motion.

Sometimes, instead of using key frame animation, it is simpler to specify animation for an object along a path. This is the focus of path-based animation. In path-based animation, the motion of an object through space is defined in terms of a path that the object follows. A path (also referred to as a "motion path") is defined independent of the object. The path defines a route in global space along which an object will move. Accordingly, the object's motion is constrained to the path. Given a path, an animator then uses a timing spline to specify an object's position along the path. The timing spline allows the animator to specify knots to control the movement of the object along the motion path. A timing spline plots time (frames) on one axis and the distance traveled along the path along the other axis. Each knot for a timing spline identifies a key frame (time point) and a position (expressed as the distance along the path) on the path at the key frame. Using an interpolation technique, a timing spline is then generated that interpolates the knots and determines the position of the object along the path at all frames for the length of the animation sequence. By editing the timing spline, an animator can control the rate of movement of the object along the path.

In path-based animation, orientation of the object is implied or determined from the position of the object along the path. One commonly used technique is to always keep the object tangent to the path as it travels along the path. For example, the orientation of a car traveling along the path is always aligned with the direction of the path. Another technique is to always keep the object in the starting orientation as it moves along the path.

Accordingly, in path-based animation, position and timing are decoupled: animators create a path in space without regard to the timing, and then time character motion along the path using a different animation channel (a timing spline). Separate controls are thus used for defining the path and defining the motion along the path. This technique is awkward for many animators, and makes animation revisions particularly difficult, since altering the path changes its total length, which in turn alters the animator's carefully tuned timing. Animators much rather prefer the direct control offered by key frame animation, where both positioning and timing are pinned by the knots of the spline.

Accordingly, what is desired are improved techniques for solving some of the problems discussed above. Additionally, what is desired are improved techniques for reducing some of the drawbacks discussed above.

BRIEF SUMMARY OF THE INVENTION

Embodiments of the present invention provide techniques that give animators the direct control they are accustomed to with key frame animation, while providing for path-based motion. A key frame animation-based interface is used to achieve path-based motion.

According to an embodiment of the present invention, techniques are provided for animating an object. In this embodiment, information is received identifying a plurality of animation variables that are coupled. A first set of knots defined for one or more animation variables in the plurality of animation variables is received, each knot for an animation variable in the first set of knots identifying a time point and a value for the animation variable at that time point. A second set of knots is generated for the plurality of animation variables based upon the first set of knots. For at least one animation variable in the plurality of animation variables, based upon the first set of knots and the second set of knots, a value is generated for the at least one animation variable at a time point at which no knot exists for the at least one animation variable in the first set of knots or the second set of knots. The animated object may be rendered on an output device using the plurality of animation variables. The plurality of animation variables may comprise animation variables used for determining a position and an orientation for the object. The knots in the first set of knots is specified by a user or using a procedural technique.

In one embodiment, generating the second set of knots may comprise processing that includes, for each knot in the first set of knots defined for an animation variable in the plurality of animation variables, generating a knot for each other animation variable in the plurality of animation variables, the generated knot for an animation variable identifying a value for the animation variable at a time point associated with the knot.

In one embodiment, a path is generated based upon the first set of knots and the second set of knots. A value for the at least one animation variable may be determined by evaluating the path. The path may be generated by determining a set of control-points for time points associated with knots for the plurality of animation variables, wherein a control-point for a time point is defined by the values of the plurality of variables at that time point.

In one embodiment, a timing spline may be generated for the path. The timing spline comprises a knot for each control-point in the set of control-points. Each knot of the timing spline identifies a time point and an indication of distance traveled along the path at that time point. Intermediate values for the animation variables may be calculated by evaluating the spatial spline or path using the timing spline.

Knots may be deleted from a timing spline. In one embodiment, a signal may be received indicating deletion of at least one knot in the timing spline. The timing spline is regenerated without the deleted knot. A control-point is determined in the path defined by values of animation variables in the plurality of animation variables associated with the deleted knot. A new time point for the control-point is determined based upon the regenerated timing spline. Intermediate values for the animation variables may be recalculated by evaluating the spatial spline or path using the regenerated timing spline.

Knots may be inserted into a timing spline. In one embodiment, a signal is received indicating insertion of a timing knot in the timing spline, the timing knot identifying a time point and an indication of distance traveled along the path at that time point. The timing spline is regenerated using the newly inserted timing knot. The intermediate values of the animation variables may also be recalculated by evaluating the path using the regenerated timing spline.

In one embodiment, the animation system operates in a "conventional" mode wherein a set of animation variables are not treated as coupled. The animation system may also operate in a "path-based" mode wherein the set of animation variables are considered coupled and a knot specified for one animation variable in the set causes knots to be automatically generated for other coupled animation variables.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details. In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

Embodiments of the present invention provide techniques that give animators the direct control they are accustomed to with key frame animation, while providing for path-based motion. A key frame-based animation system is provided that uses path-based evaluation.

In one embodiment, animators continue to author knots in animation splines for animation variables as in key frame animation. However, unlike conventional key frame animation where each animation variable is independent of other animation variables, according to an embodiment of the present invention, the animator may identify a set of animation variables to be coupled. For the coupled set of animation variables, a knot defined for one animation variable at a particular time point (frame) may result in knots being automatically generated and inserted for the one animation variable or for one or more of the other coupled animation variables at the particular time point or at different time points. In one embodiment, for a coupled set of animation variables, a knot specified for one animation variable at a time point (frame) causes knots to be automatically generated for the other animation variables in the set at that time point or frame. In this manner, the knots for an animation variable in the set of coupled animation variables depend upon knots specified for other animation variables in the set. A knot for one animation variable is thus made dependent upon a knot specified for another animation variable in the set.

The choice of which animation variables are to be coupled is up to the animator. For example, in key frame animation, animation variables that are commonly used to specify the position and orientation of an object include translation animation variables $T_x$, $T_y$, $T_z$, and rotational animation variables $R_x$, $R_y$, $R_z$. The translation animation variables and the rotation animation variables are together referred to as transformation animation variables. In one embodiment, the transformation animation variables may be coupled. The following description describes features of the present invention using coupled transformation animation variables as examples. It should be apparent that other animation variables may be coupled in alternative embodiments and the techniques described below apply to the coupled animation variables.

For a set of coupled transformation animation variables, even though the animation variables are coupled, the animator may author knots for each transformation animation variable independent of knots for any other coupled transformation animation variable. A knot for an animation variable specifies a value assigned to the animation variable at a particular frame or time point. A knot for an animation variable provides a control point for an interpolation spline for the animation variable and is editable by the animator.

Figure 1:
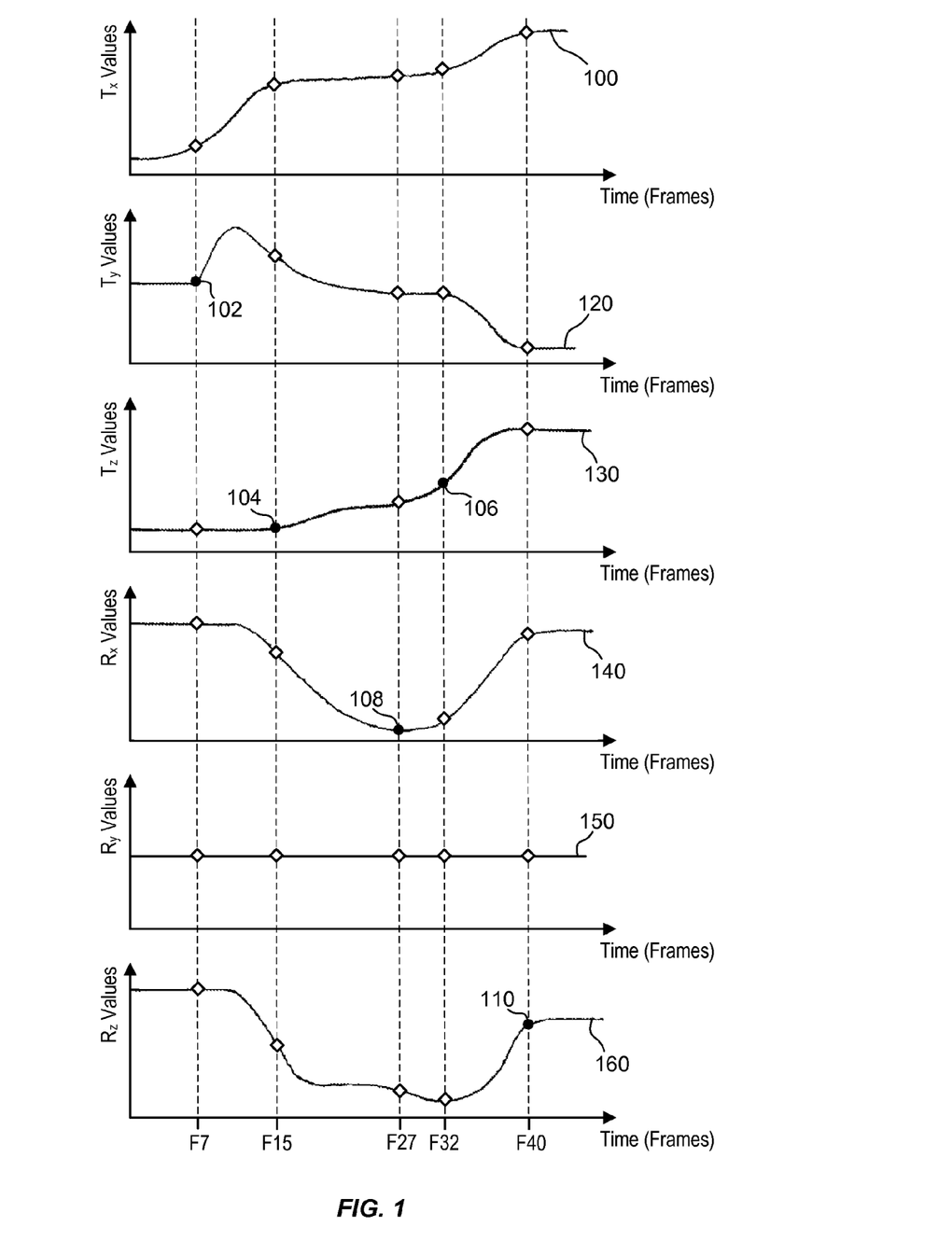
FIG. 1 depicts animation splines for controlling transformation animation variables.

In animation systems, animation splines are generally used to author and control animation variables. FIG. 1 depicts animation splines 100, 120, 130, 140, 150, and 160 for controlling each of the transformation animation variables $T_x$, $T_y$, $T_z$, $R_x$, $R_y$, $R_z$, respectively. While FIG. 1 and the accompanying description refer to transformation animation variables, the principles described also apply to other animation variables. A spline for an animation variable is based upon knots specified for the animation variable. The knot may be authored or specified by an animator or by other procedural techniques such as by a simulation, by kinematic solvers, or by other techniques that may be used to author knots. As in key frame animation, knots may be specified or authored for a transformation animation variable at different frames independent of knots for other animation variables. In FIG. 1, the specified knots are depicted using circles. As shown, a knot 102 has been specified for $T_y$ at key frame 7, a knot 104 is specified for $T_z$ at frame 15 and another knot 106 at frame 32, a knot 108 is specified for $R_x$ at key frame 27, and a knot 110 is specified for $R_z$ at key frame 40. As in key frame animation, these knots are specified independent of each other.

As previously indicated, for a coupled set of knots, a knot defined for one animation variable at a particular time point (frame) may result in knots being automatically generated and inserted for the one animation variable or for one or more of the other coupled animation variables at the particular time point or at different time points. According to an embodiment of the present invention, for each knot specified for a transformation animation variable, the animation system automatically generates knots for the other transformation animation variables at the time point (key frame) of the specified knot. In this manner, for a particular knot specified or authored for a transformation animation variable, knots are automatically generated for the other transformation animation variables at the time point or frame of the particular knot. In general, for a set of coupled animation variables, for a particular knot specified for an animation variable, knots are automatically generated for the other coupled animation variables at the time point or frame of the particular knot. The automatically generated knots are adjustable by an animator.

For example, in FIG. 1, for knot 102 specified at frame 7 for $T_y$, the animation system automatically generates knots at frame 7 for the other transformation animation variables $T_y$, $T_z$, $R_x$, $R_y$, and $R_z$. The generated knots (identified in FIG. 1 by diamonds) are inserted into the animation splines for animation variables $T_y$, $T_z$, $R_x$, $R_y$, $R_z$ at frame 7. In this manner, for each animator-specified knot for an animation variable, the animation system generates and inserts knots at the corresponding key frames for the other animation variables. In FIG. 1, the knots automatically generated and inserted by the animation system in the animation splines of the transformation animation variables are denoted by diamonds.

By specifying knots for an animation variable, the animator can specify and pin down the values for the animation variable at specific time points, just like in key frame animation. The animator thus has the control offered by key frame animation. For any specified knot, the animation system then automatically generates knots for the other coupled animation variables at the key frame associated with the animator-specified knot. In this manner, the animation variables (e.g. the transformation animation variables depicted in FIG. 1) are coupled to each other. This results in a set of $T_x$, $T_y$, $T_z$, $R_x$, $R_y$, $R_z$ knots being available for each key frame for which any knot has been specified for an animation variable. This may be represented as:

$$(F,(T_x,T_y,T_z,R_x,R_y,R_z))$$

where F denotes a specific time point or frame at which a knot has been specified for at least one animation variable from $T_x$, $T_y$, $T_z$, $R_x$, $R_y$, $R_z$ and $(T_x, T_y, T_z, R_x, R_y, R_z)$ denotes a set of knot values for the transformation animation variables at that specific time point or key frame. In the example depicted in FIG. 1, a set of $(T_x, T_y, T_z, R_x, R_y, R_z)$ knots is available for each of key frames 7, 15, 27, 32, and 40.

According to an embodiment of the present invention, based upon the set of knots specified for the animation variables and the set of knots automatically generated based upon the specified knots, values (referred to as intermediate values) are then calculated for the coupled animation variables at time points at which no knots have been specified or generated. For example, in FIG. 1, for animation variables depicted in intermediate values are determined for the animation variables between frame 0 and frame 7, between frame 7 and frame 15, between frame 15 and frame 27, between frame 27 and frame 32, between frame 32 and frame 40, and between frame 40 and the duration of the animation.

Different techniques may be used for determining the intermediate values based upon the specified knots and the generated knots for the coupled animation variables. According to an embodiment of the present invention, the specified and generated knots for the coupled animation variables are used to define a path and the path is then evaluated to determine the intermediate values for the animation variables. As described above for the set of coupled transformation animation variables, $T_x$, $T_y$, $T_z$, $R_x$, $R_y$, and $R_z$ knots are available for each time point associated with any specified knot. The values of $T_x$, $T_y$, $T_z$, $R_x$, $R_y$, and $R_z$ at a particular time point (or frame) represent a control-point in 3-dimensional space, with tangent-direction control provided by the rotational values. As shown above, the control-point may be represented as (F, ($T_x$, $T_y$, $T_z$, $R_x$, $R_y$, $R_z$)). A set of such control-points determined from the knots of the transformation animation variables is used to define a spatial path. For each such control-point, the values of $T_x$, $T_y$, $T_z$ define a position in space of the object at a time or frame F and the values of $R_x$, $R_y$, $R_z$ define the orientation of the object at time or key frame F. Accordingly, each such control-point has a time component associated with it and values that define the position and orientation of the object at that time point.

The spatial path may be automatically generated by the animation system. In one embodiment, the animation system generates the spatial "path" (also referred to as a "spatial spline" or "space-time spline") by interpolating the control-points. Various splining techniques may be used to generate the path based upon the control-points including linear, cubic, B-spline, Bezier spline, Cardinal spline, Catmull-Rom splines, etc. This gives rise to a space-time spline: a path where each control-point in the spatial path has time built-in. Since the path is determined based upon knots specified for animation variables using key frame animation techniques, the path is authored based upon key frame animation variables. In one embodiment, the path passes through the positions and orientations or poses corresponding to the control-points determined from the knots in the key frame animation splines. This is different from conventional path-based animation where a path or spatial spline is authored in space independent of key frame animation variables.

Figure 2:
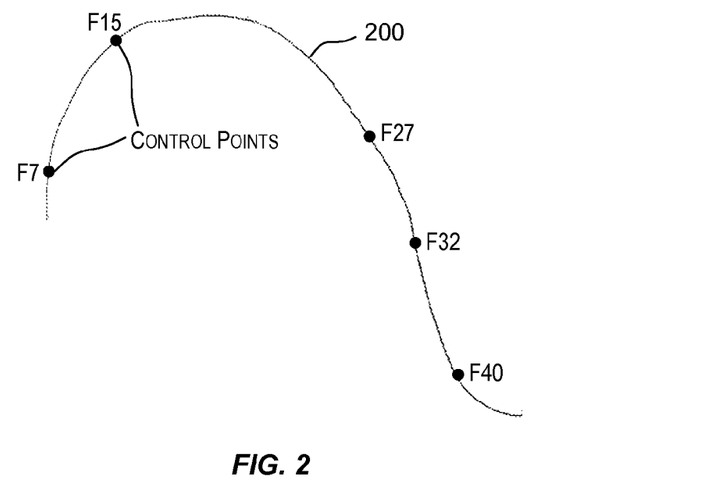
FIG. 2 depicts a path determined from the control-points determined from knots specified for animation variables using key frame animation techniques according to an embodiment of the present invention.

FIG. 2 depicts a path 200 determined from the control-points determined from knots specified for animation variables using key frame animation techniques according to an embodiment of the present invention. Path 200 in FIG. 2 is generated based upon the specified and automatically generated knots depicted in FIG. 1. Path 200 is determined by interpolating the control-points at key frames 7, 15, 27, 32, and 40, After a path (such as path 200 depicted in FIG. 2) is determined, the path is then used to determine intermediate values for each coupled transformation animation variable for frames where there are no knots (either specified or automatically generated) defined for the animation variable for the duration of the animation. Accordingly, for an animation variable, the path is used to determine values for that animation variable at frames where there are no knots defined in the animation spline for that animation variable. For example, values for the transformation animation variable $T_x$ at frames where there are no knots in the $T_x$ animation spline are determined by evaluating the path. Values for the other animation variables are also determined in a similar manner using path-based evaluation. For example, in the example depicted in FIGS. 1 and 2, assuming that the duration of the animation is 50 frames, then values are determined for each transformation animation variable between frame 0 and frame 7, between frame 7 and frame 15, between frame 15 and frame 27, between frame 27 and frame 32, between frame 32 and frame 40, and between frame 40 and frame 50 are determined by evaluating the path 200 between the respective control-points.

Accordingly, for an animation variable in a set of coupled animation variables, instead of determining intermediate values for the animation variable by interpolating the knots associated with the animation variable as in conventional key frame animation, in embodiments of the present invention, the intermediate values for the animation variable are determined by evaluating the path defined from the control-points determined from the knots that have been specified and automatically generated for the coupled animation variables. The independent spline interpolation used in conventional key frame animation is replaced by an algorithm that evaluates the group of animation variables together in a path-based way using a path evaluation function. As a result, the position and orientation values of the animated object along the path are determined by evaluating the path.

The path-evaluated intermediate values for the transformation animation variables are then used to define the shape of the animation splines of the transformation animation variables between the knots in the splines. By looking at the shapes of the animation splines for the transformation animation variables the animator can see the effect of the path-based evaluation and make appropriate changes if needed to smooth out the motion.

As described above, a path evaluation technique is used to find values for the transformation animation variables at intermediate frames. Since the values of the position-related animation variables ($T_x$, $T_y$, $T_z$) and the orientation-related animation variables ($R_x$, $R_y$, $R_z$) are extracted by evaluating the path between the control-points defined by the knots in the transformation animation variables, the resultant motion and orientation is path-based. Accordingly, such an animation system provides the direct control and re-timing benefits of key frame animation, while providing for path-based motion.

For example, the animator may use key frame animation techniques to author values for $R_x$, $R_y$, $R_z$ that control the orientation of the object at specific time points. This allows the animator to specify and customize the orientation of an object at different key frames. Between the key frames, the orientation of the object is evaluated using path-based techniques. Similarly, the animator may use key frame animation techniques to author values for $T_x$, $T_y$, $T_z$ that control the position of the object at specific time points. This allows the animator to specify and customize the position of an object at different key frames. Between these key frames, the position of the object is evaluated using path-based techniques. The animator thus has the control to pin down specific poses (including position and orientation) of the object at specific times using key frame animation techniques, while the position and orientation values for the intermediate frames between the poses are determined by evaluating a path, thereby providing path-based motion. The system thus provides a key frame animation-based interface to achieve path-based motion.

In one embodiment, additional tangent controls may be provided for the control-points in the spatial spline. A tangent control for a control-point in the spatial spline enables the animator to change the shape of the path around that control-point (e.g., make it more or less "loopy"). A tangent control is another animation variable that is coupled to the transformation animation variables. Accordingly, an animator may independently specify values for the tangent control at specific frames of interest. The animation system then generates knots for the coupled animation variables for the frames for which the knots have been specified for the tangent control. Likewise, when a knot is specified for a transformation animation variable, the animation system automatically generates knots for the other transformation animation variables (as previously described) and also calculates a knot for the tangent control animation variable at the corresponding frame. In this manner, the tangent control animation variable is coupled to the other transformation animation variables. Other controls may also be provided for controlling the shape of the spatial spline. These controls are also then coupled with the other animation variables.

Figure 3:
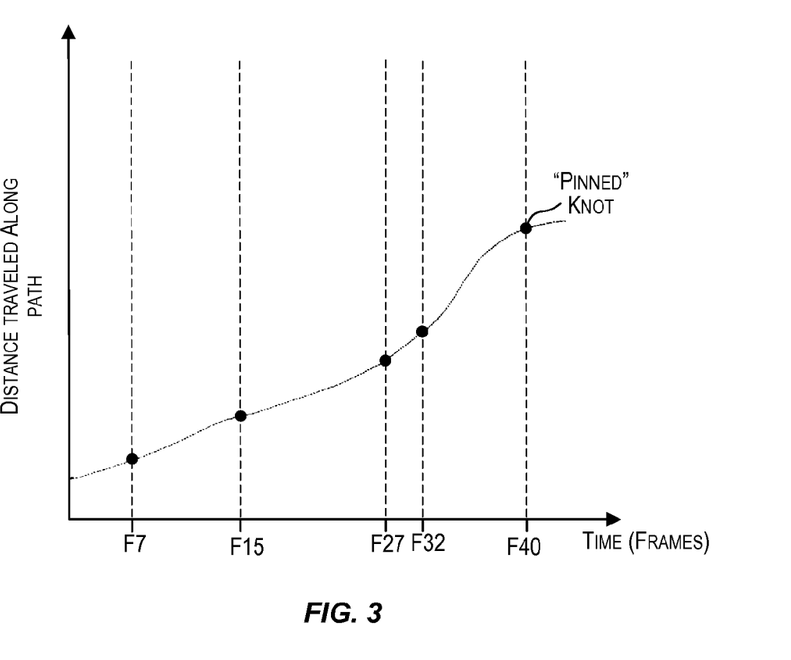
FIG. 3 depicts a timing spline generated for the path depicted in FIG. 2 according to an embodiment of the present invention.

A timing spline may also be calculated for the path determined from the animation variable knots. FIG. 3 depicts a timing spline generated for path 200 depicted in FIG. 2 according to an embodiment of the present invention. In the embodiment depicted in FIG. 3, the timing spline plots time on one axis (expressed in frames) and the distance along the path along the other axis. In an alternative embodiment, a timing spline may show the percentage of distance on the path (instead of the actual distance) along the other axis. Each knot on a timing spline corresponds to a control-point used to define the spatial spline. In the timing spline, each knot identifies a frame (time point) and a position (expressed as the distance along the path) along the path at that frame. A knot is inserted in the timing spline for each control-point in the spatial spline. For a knot in the timing spline at a particular frame, the distance traveled by the object along the path at that frame may be determined from the path. In one embodiment, the animation system automatically determines the distance traveled along the path for each control-point and adds a knot to the timing spline corresponding to that value at the corresponding frame.

As depicted in FIG. 3, knots are inserted in the timing spline at key frames 7, 15, 27, 32, and 40 corresponding to the key frames associated with the control-points used to define path 200 in FIG. 2 which in turn are based upon knots specified for the animation variables in FIG. 1. The distance traveled along the path at each of the frames in the timing spline is determined from path 200 depicted in FIG. 2.

Since the knots in the timing spline correspond to control-points on the spatial spline corresponding to knots authored in the transformation animation variables, the values of the knots in the timing spline are pinned and cannot be changed by the animator. These knots in the timing spline are accordingly referred to as "pinned knots". The timing spline is thus constrained in that the time-location and value of the knots in the timing spline cannot be changed. An animator can change tangent handles (but not values) of the "pinned knots" to shape the timing spline between "pinned" knots.

The timing spline and the spatial spline may be used to determine inter mediate values (i.e., values for the transformation animation variables at frames for which no knots are present for the transformation animation variables) for the transformation animation variables. In one embodiment, the intermediate values are calculated by evaluating the spatial spline or path at distances specified by evaluating the recalculated timing spline at the corresponding frames. The timing spline is used to determine where (at what distance along the path) the spatial spline is evaluated to compute the intermediate values of the animation variables.

Figure 4:
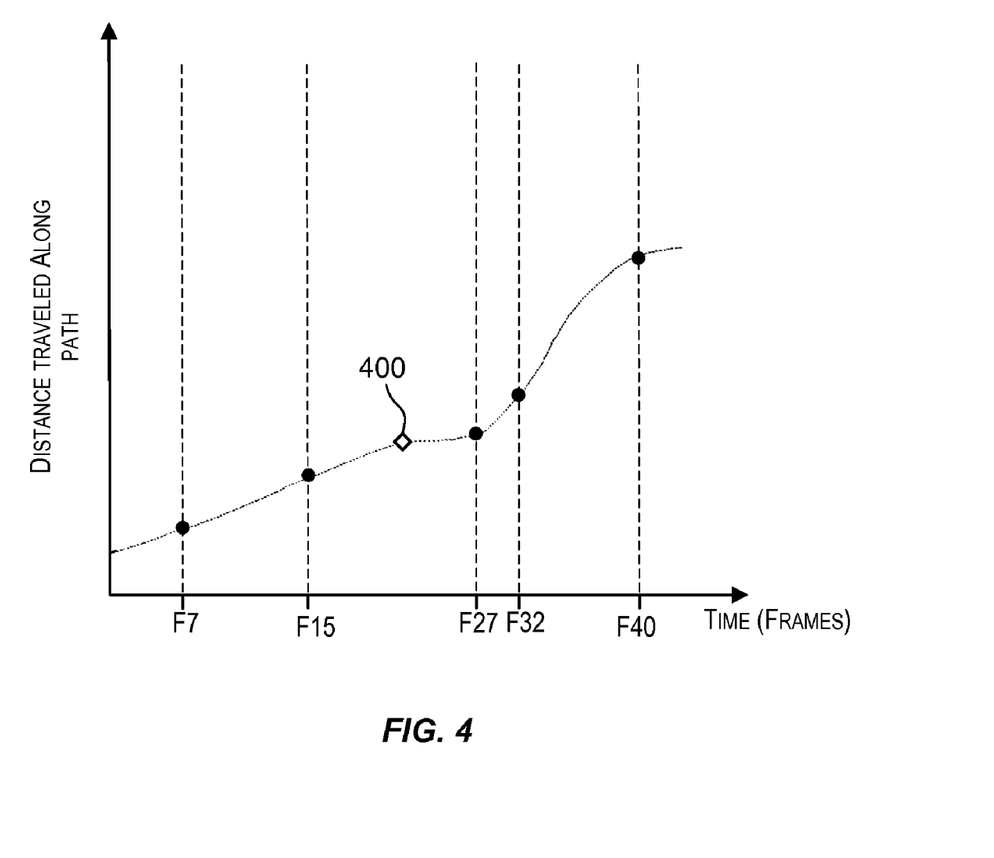
FIG. 4 depicts a timing spline with knots inserted into the timing spline according to an embodiment of the present invention.

Even though an animator cannot change the "pinned" knots in the timing spline that are determined from the control-points for the path, the animator may add new knots (timing knots) to the timing spline. The animator may insert timing knots to add complexity to the motion of the object along the path. For example, as depicted in FIG. 4, a timing knot 400 has been inserted into the timing spline depicted in FIG. 3. Timing knots inserted between two pinned knots in the timing spline may change the motion of the object on the path between key frames corresponding to the two pinned knots.

Upon insertion of a timing knot(s), the timing spline is recalculated using the inserted timing knot(s) and the pinned knots. This in turn may lead to a change in the intermediate values for the transformation animation variables that are determined by evaluating the path between key frames corresponding to the pinned knots at distances along the path determined by evaluating the timing spline. In one embodiment, in response to insertion of a timing knot in the timing spline, the animation system is configured to recalculate the timing spline using the timing knot and the pinned knots, and recalculate intermediate values for the transformation animation variables at the intermediate frames based upon the spatial spline and the recalculated timing spline.). Intermediate values (i.e., values for the transformation animation variables at frames for which no knots are present for the transformation animation variables) are then recalculated by evaluating the spatial spline or path at distances specified by evaluating the recalculated timing spline at the corresponding frames.

Accordingly, using a timing spline, an animator may introduce various degrees of timing complexity to the movement of the object along the path even though the path itself may not be spatially complex. The timing spline enables the animator to fine-tune the motion of the object along the path.

In one embodiment, a "pinned" knot may be deleted from a timing spline. An animator may delete a pinned knot to indicate to the animation system that the animator wants the object to hit the pose corresponding to the $T_x$, $T_y$, $T_z$, $R_x$, $R_y$, $R_z$ values corresponding to the deleted knot but the animator does not care when (at what frame) the object hits the pose. Such poses are referred to as "floating poses". A floating pose is a control point in the path (which is defined by knots in the translational and rotational animation variables) explicitly designated as having no fixed time. Accordingly, by deleting a knot in the timing spline, the restriction on the timing spline is reduced. The timing spline is recalculated. For each floating pose, the animation system solves for a time for the pose that satisfies the timing constraints of the timing spline. One or more pinned knots may be deleted from a timing spline leading to one or more floating poses.). Intermediate values for the animation variables may be recalculated by evaluating the spatial spline or path at distances specified by evaluating the recalculated timing spline at the corresponding frames.

Figure 5:
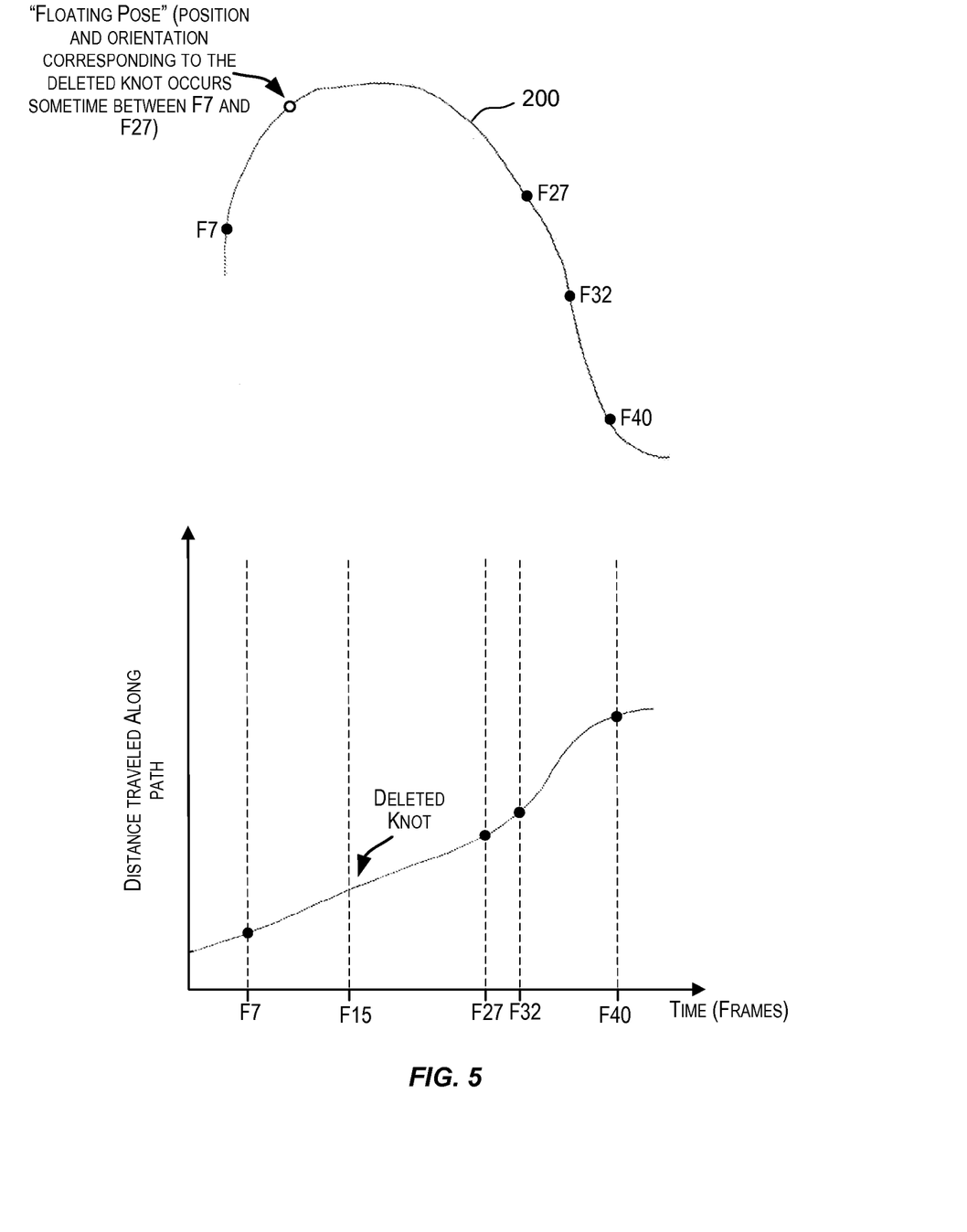
FIG. 5 depicts a timing spline with a deleted knot leading to a floating pose according to an embodiment of the present invention.

As depicted in FIG. 5, a knot at frame 15 has been deleted from the timing spline. As a result the timing spline is recalculated. The time of the pose corresponding to values for the deleted knot occurs at a frame between frame 7 and frame 27. The animation system automatically solves for a specific time (a frame between frame 7 and frame 27) for the floating pose based upon the recalculated timing spline.

"Floating poses" resulting from deleted timing spline knots enable animators to decrease the temporal complexity (i.e., how an object moves over time) associated with the motion of an object along the path. This is especially useful in situations where the spatial complexity is high (i.e., path is very complicated) but the animator may want to reduce the temporal complexity, for example, may want the object to move at a constant speed along a convoluted path. By deleting a knot and thereby creating a floating pose, the animator lets the animation system determine the time when the pose is achieved along the path per the timing spline.

As described above, a set of animation variables may be specified that are to be coupled. As a result of the coupling, in one embodiment, a knot specified for one animation variable in the set of coupled animation variables causes knots to be automatically generated for the other animation variables in the set at the time point (frame) of the specified knot. In one embodiment, the animation system may operate in different modes including a mode ("path-based" mode) in which the animation variables are treated as being coupled and another mode ("conventional" mode) in which the animation variables are not considered coupled. Accordingly, in the "path-based" mode, when a knot is specified for one animation variable in the set of coupled animation variables, knots are automatically generated for the other coupled animation variables in the set at the time point (frame) of the specified knot. When in "conventional" mode, the system does not impose the restriction that knots must be generated and inserted for all the coupled animation variables. As a result, in the "conventional" mode, a knot specified for an animation variable in the set of coupled animation variables does not cause knots to be generated for the other animation variables in the set. Accordingly, in the "path-based" mode key frame animation is used as an interface to achieve path-based motion (as described above) and in the "conventional" mode regular conventional key frame animation is performed.

The animation system may provide a "switch" that enables an animator or user to switch between the "path-based" mode and the "conventional" mode. When the system operates in "conventional" mode (i.e., "path-based" mode is turned off) the translational and rotational animation variables simply revert to using standard animation-spline interpolation. The "path-based" mode may be turned on or off for an entire shot, or just for a specific frame-range or for other time periods. For example, the animation system may operate in conventional mode during the first 100 key frames; the animator may then turn "on" the "path-based" mode and operate in the path-based mode for the next 50 key frames, and so on.

Figure 6:
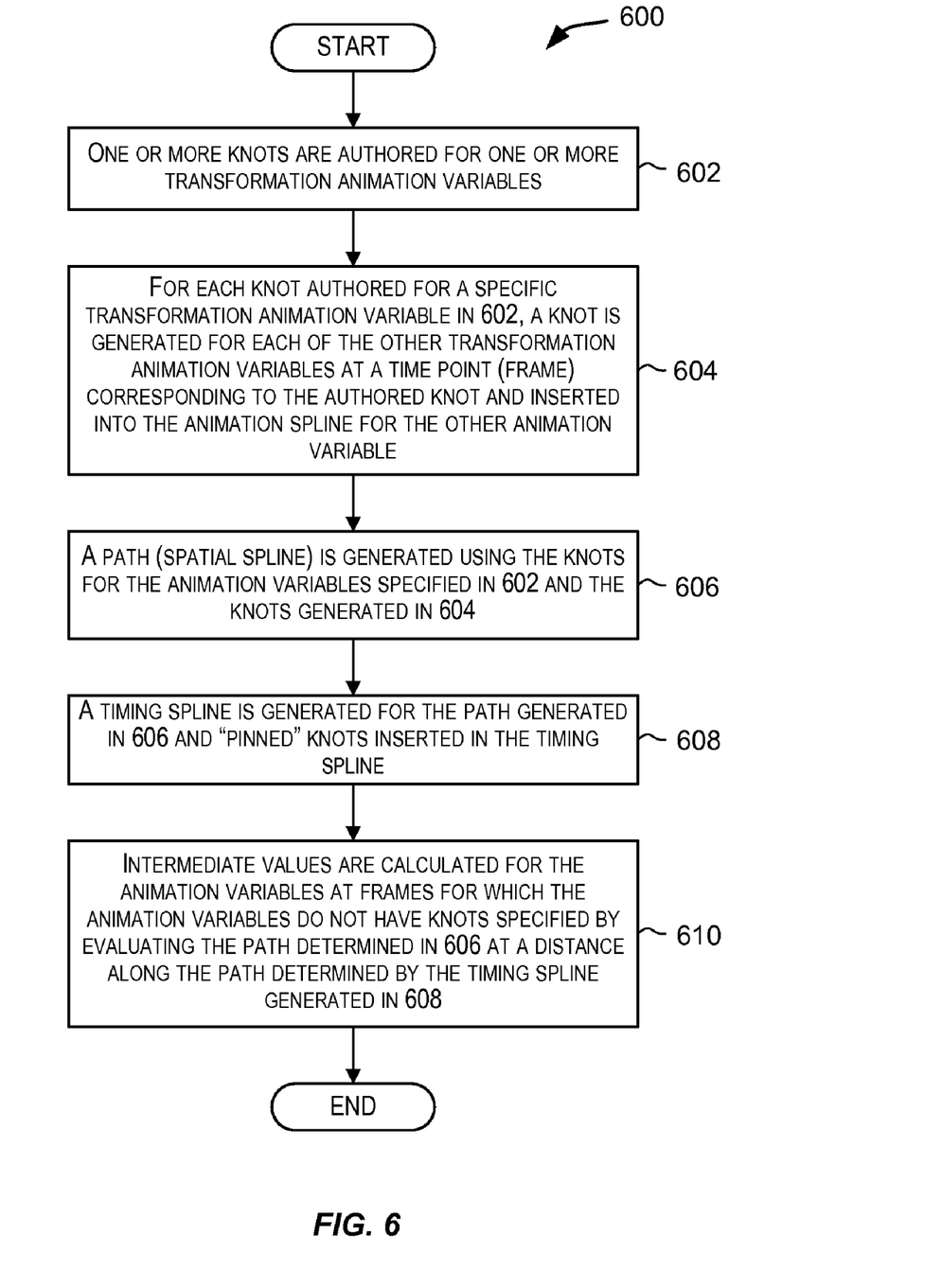
FIG. 6 depicts a simplified flowchart describing a method for providing path-based motion using a key frame animation interface according to an embodiment of the present invention.

FIG. 6 depicts a simplified flowchart 600 depicting a method for providing path-based motion using a key frame animation interface according to an embodiment of the present invention. The processing depicted in flowchart 600 may be performed by hardware modules, software modules (e.g., code or instructions) executed by a processor, or combinations thereof. The processing depicted in FIG. 6 is performed by the animation system when operating in "path-based" mode. The processing depicted in FIG. 6 further assumes that the animator has specified that the transformation animation variables are to be coupled. Knots may be authored by an animator or using other techniques such as by a simulation, by kinematic solvers, or by other techniques that may be used to author knots.

As depicted in FIG. 6, an animator may use a key frame animation technique to author one or more knots in one or more splines of transformation animation variables $T_x$, $T_y$, $T_z$, $R_x$, $R_y$, or $R_z$ for an animated object (step 602). A knot for one transformation animation variable may be authored independently from knots for other transformation animation variables as in key frame animation. An authored knot for an animation variable identifies a value assigned to the animation variable at a particular time point (frame). The knots in 602 may be authored by an animator, by a simulation, by kinematic solvers, or by other techniques that may be used to author knots.

For each knot authored for a transformation animation variable in 602, a knot is automatically generated for each of the other transformation animation variables at a time point (frame) corresponding to the authored knot (step 604). Accordingly, in 604, for a knot specified for a transformation animation variable, a value is determined for each of the other transformation animation variables at a time point (frame) of the specified knot. The generated knots are inserted into the animation splines for the transformation animation variables.

For example, as depicted in FIG. 1, for each authored knot (represented by a circle) for a transformation animation variable, knots (represented by diamonds) are generated and inserted into the animation splines for the other transformation animation variables. For example, for a knot 102 authored for $T_y$ at frame 7, values for $T_y$, $T_z$, $R_x$, $R_y$, and $R_z$ are determined at frame 7 and the corresponding knots inserted into the animation splines for the transformation animation variables. In one embodiment, the animation system is configured to automatically determine the authored knots and generate and insert knots in the splines for the transformation animation variables. As a result of the processing performed in 604, knots for all the transformation animation variables are available for each key frame at which a knot has been authored in 602.

A path (or spatial spline) is then generated based upon the knots authored for the transformation animation variables in 602 and the knots generated and inserted into the animation splines for the animation variables in 604 (step 606). As described above, as a result of the processing performed in 604, knots for transformation animation variables are available for each frame at which a knot has been authored in 602. Accordingly, for a time point or frame at which a knot is authored, both translation animation variable values ($T_x$, $T_y$, $T_z$) and rotational animation variable values ($R_x$, $R_y$, $R_z$) are available. The $T_x$, $T_y$, $T_z$, $R_x$, $R_y$, and $R_z$ values at each time point (frame) represent a control-point with tangent-direction control that defines a position and orientation in space of an object at that time (frame).

The control-points are then used to define a path in 606. A path or spatial spline is generated in 606 by interpolating the control-points using a splining technique such as a linear, cubic, B-spline, Bezier spline, Cardinal spline, Catmull-Rom splines, etc. This gives rise to a spatial or space-time spline representing a path where each control-point in the spatial path has time built-in. Since the path in 606 is determined based upon knots specified for the transformation animation variables in 602 using key frame animation techniques, the path is effectively authored based upon key frame animation variables. In one embodiment, the path passes through the positions or poses corresponding to the control-points determined from the knots in the transformation animation variables animation splines. This is different from conventional path-based animation where a path or spatial spline is authored in space independent of key frame animation variables.

A timing spline may be generated for the path generated in 606 (step 608). The timing spline plots time on one axis (in frames) and the distance traveled along the path along the other axis. In an alternative embodiment, the percentage of distance along the path may be plotted. Knots are inserted into the timing spline for each frame for which knots are authored in 602 (i.e., knots are inserted in the timing spline for each frame associated with control-points that are used to define the path). For a knot in the timing spline at a particular key frame, the distance traveled by the object along the path at that key frame is determined from the path generated in 606. Since the knots in the timing spline correspond to control-points on the spatial spline corresponding to knots authored in the transformation animation variables, the values of the knots in the timing spline are pinned and cannot be changed by the animator. These knots in the timing spline are accordingly referred to as "pinned knots". The timing spline is thus constrained in that the time-location and value of the knots in the timing spline cannot be changed. An animator can change tangent handles (but not values) of the "pinned knots" to shape the timing spline between "pinned" knots.

Intermediate values are computed for the transformation animation variables at frames where there are no knots in the animation splines, either authored or generated (step 610). In one embodiment, the timing spline generated in 608 is used to determine where (at what distance along the path) the spatial spline generated in 606 is evaluated to compute the intermediate values of the animation variables. The intermediate values are calculated by evaluating the spatial spline or path at distances specified by evaluating the recalculated timing spline at the corresponding frames. Accordingly, the intermediate values are determined by evaluating the path using the timing spline.

Accordingly, for an animation variable, instead of determining intermediate values for the transformation animation variable by interpolating the knots associated with the animation variable as in conventional key frame animation, in embodiments of the present invention, the intermediate values for the animation variable at frames for which no knots are present are determined by evaluating the path defined from the control-points. The independent spline interpolation used in conventional key frame animation is replaced by an algorithm that evaluates the transformation animation variables together in a path-based way using a path evaluation function. As a result, the position $(T_x, T_y, T_z)$ and orientation values $(R_x, R_y, R_z)$ of the animated object along the path are determined by evaluating the path. Since the values of the position-related animation variables $T_x, T_y, T_z$ and the orientation-related animation variables $R_x, R_y, R_z$ are determined by evaluating the path, the resultant motion and orientation is path-based. In this manner, the animation system provides the direct control and re-timing benefits of key frame animation, while providing for path-based motion. The system provides a key frame animation-based interface to achieve path-based motion.

The animation system may provide an interface that enables animators or users to author knots according to step 602. The animation system may be configured to automatically perform the processing depicted in steps 604, 606, 608, and 610 after the animator has authored the knots in 602.

Figure 7:
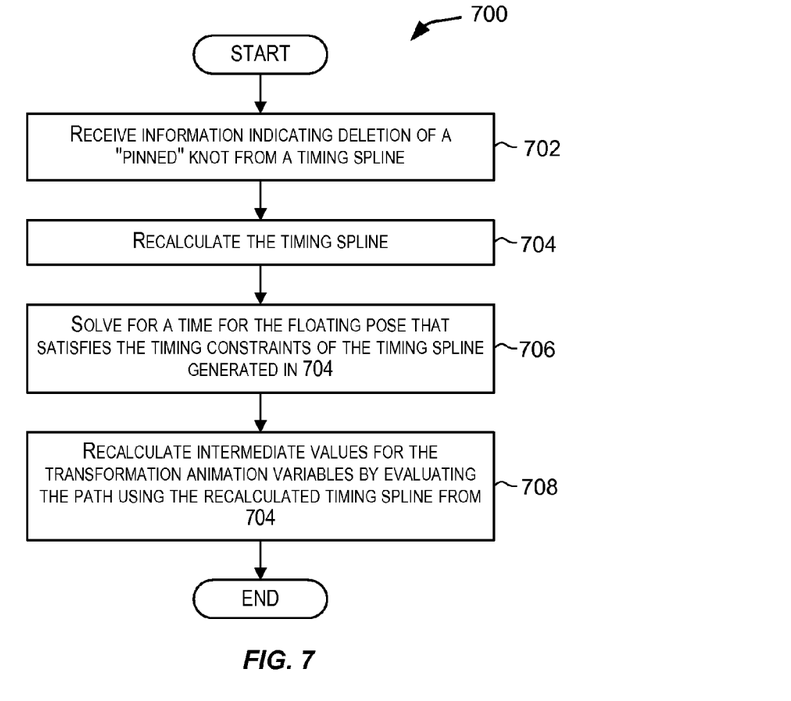
FIG. 7 depicts a simplified flowchart depicting a method for processing deleted knots from a timing spline according to an embodiment of the present invention.

As previously described, although "pinned" knots in a timing spline cannot be changed, a "pinned" knot may be deleted leading to a "floating pose". FIG. 7 depicts a simplified flowchart 700 depicting a method for processing deleted knots from a timing spline according to an embodiment of the present invention. The processing depicted in flowchart 700 may be performed by hardware modules, software modules (e.g., code or instructions) executed by a processor, or combinations thereof.

As depicted in FIG. 7, the animation system receives information indicating that a "pinned" knot is deleted from a timing spline (step 702). For example, when an animator or user deletes a "pinned" knot from the timing spline, a signal may be sent to the animation system to process the deletion. Deletion of a "pinned knot" indicates to the animation system that the animator wants the object to hit the pose corresponding to the $T_x, T_y, T_z, R_x, R_y, R_z$ values corresponding to the deleted knot but the animator does not care when (at what frame) the object hits the pose. Thus, such a pose is referred to as "floating pose". A floating pose is a pose in the path (defined by knots in the translational and rotational animation variables) explicitly designated as having no fixed time.

Deletion of a pinned knot reduces the constraints on the timing curve and the timing spline is recalculated using the knots for the timing spline without considering the deleted knot (step 704). The animation system then solves for a time for the floating pose that satisfies the timing constraints of the timing spline generated in 704 (step 706). Intermediate values for the animation variables may be recalculated (step 708). In one embodiment, the timing spline generated in 704 is used to determine where (at what distance along the path) the spatial spline is evaluated to compute the intermediate values of the animation variables. The intermediate values are calculated by evaluating the spatial spline or path at distances specified by evaluating the recalculated timing spline at the corresponding frames. Accordingly, the intermediate values are recalculated by evaluating the path using the regenerated timing spline.

Figure 8:
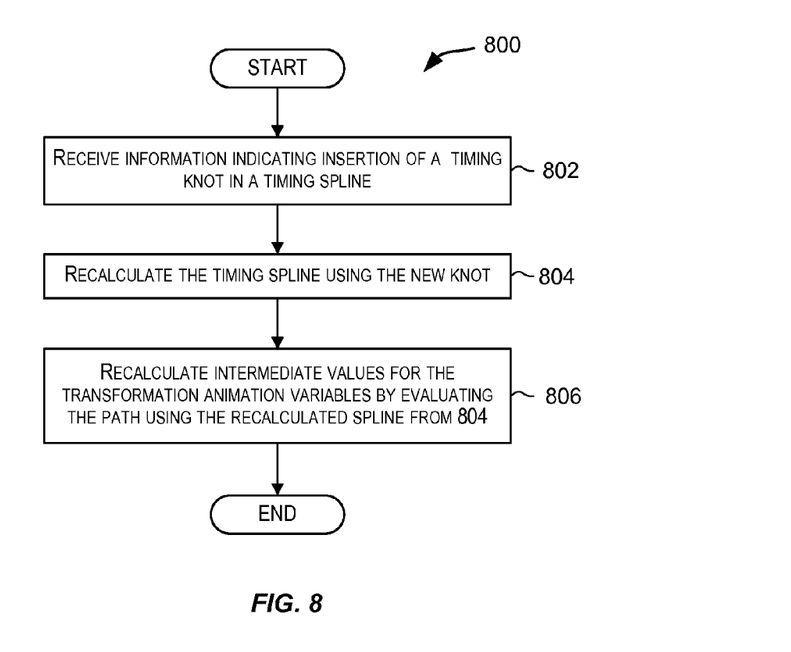
FIG. 8 depicts a simplified flowchart depicting a method performed upon inserting a timing knot in a timing spline according to an embodiment of the present invention.

As previously indicated, timing knots may be inserted into a timing spline. FIG. 8 depicts a simplified flowchart 800 depicting a method performed upon inserting a timing knot in a timing spline according to an embodiment of the present invention. The processing depicted in flowchart 800 may be performed by hardware modules, software modules (e.g., code or instructions) executed by a processor, or combinations thereof. The processing depicted in FIG. 8 assumes that the animation system is operating in "path-based" mode".

As depicted in FIG. 8, processing may be initiated upon receiving information that a timing knot has been inserted in a timing spline (step 802). The timing spline is then recalculated based upon the pinned knots of the spline and the timing knot inserted in 802 (step 804). Intermediate values (i.e., values for the transformation animation variables at frames for which no knots are present for the transformation animation variables) are then recalculated by evaluating the spatial spline or path at distances specified by evaluating the recalculated timing spline at the corresponding frames (step 806). Accordingly, the intermediate values are recalculated by evaluating the path using the regenerated timing spline.

The techniques described above may be used whenever the animator wants to control the position and orientation of an object at different frames but also wants the object to follow a path. Embodiments of the present interface provide a key frame animation based interface that enable an animator to specify knots for transformation animation variables as in key frame animation, but which produces a path-based motion. A key frame animation interface is thus provided that produces path-based motion. Such an animation system may be used for animating motion of animated objects such as cars in such a way that the resultant animation appears realistic and does not cause the cars to "skid".

The animation processing may continue wherein images are rendered based upon the knots associated with animation variables, the intermediate values determined for the coupled animation variables, and the spatial spline. The rendered images may include images rendered according to "path-based" mode and images rendered according to "conventional" mode. The rendered images may be stored in a memory medium from where they can be accessed for display via an output device. The rendered images may be stored in a memory or computer-readable medium such as user viewable media (film stock, printed media), magnetic media (hard disk, storage area network, etc), optical media (CD ROM, DVD ROM, holographic memory, semiconductor media (flash memory, RAM, ROM), and the like. The rendered images may be output via a display device. The rendered images may be used for full cg animation, or integrated with any other computer-generated objects, combined with live-action images, combined with a matte painting, and the like.

Figure 9:
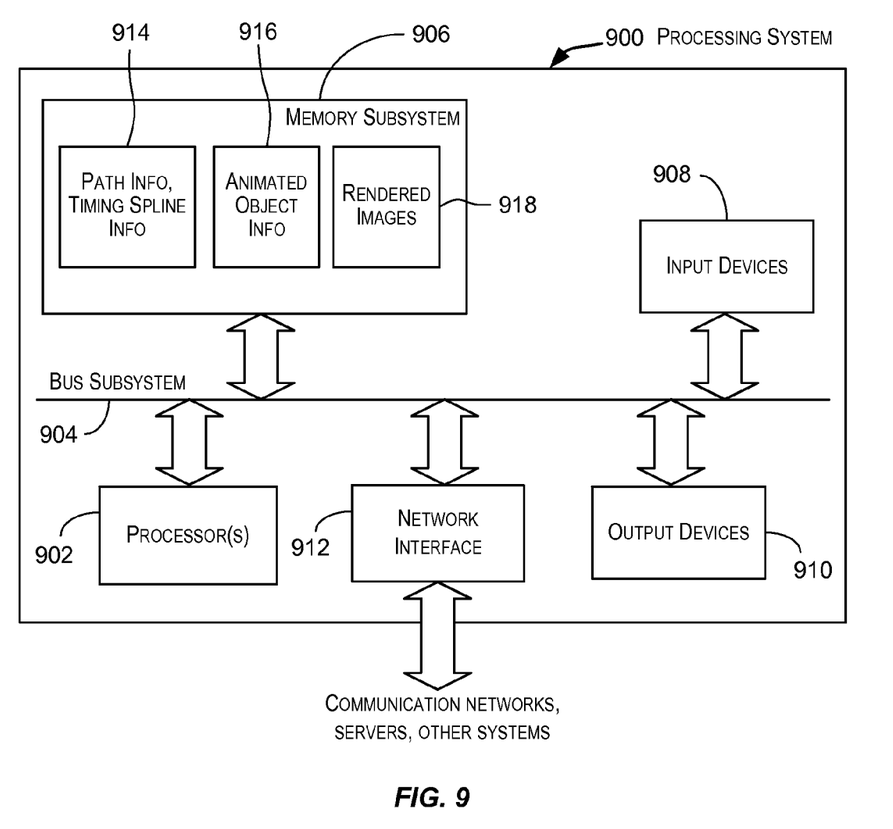
FIG. 9 is a simplified block diagram of a processing system that may be used to practice an embodiment of the present invention.

FIG. 9 is a simplified block diagram of a processing system 900 that may be used to practice an embodiment of the present invention. For example, system 900 may be a system used for performing animation according to the teachings of the present invention. System 900 may be used to render scenes and output rendered images. As shown in FIG. 9, system 900 includes a processor 902 that communicates with a number of peripheral devices via a bus subsystem 904. These peripheral devices may include a memory subsystem 906, input devices 908, output devices 910, and a network interface subsystem 912. Bus subsystem 904 provides a mechanism for letting the various components and subsystems of system 900 communicate with each other as intended. Although bus subsystem 904 is shown schematically as a single bus, alternative embodiments of the bus subsystem may utilize multiple busses.

Processor 902 is configured to perform processing performed by system 900. For example, processor 902 may be configured to execute code modules or instructions to perform processing according to an embodiment of the present invention. Processor 902 may also control other subsystems or devices. In some embodiments, processor 902 may be a graphics processing unit (GPU) such as GPUs provided by ATI, NVidia, or the like. In alternative embodiments, a GPU may be provided in addition to a processor 902 and may work with processor 902 to perform the graphics processing.

Input devices 908 enable a user such as an animator to interact with and provide information to system 900. Input devices 908 may include wired or wireless devices such as a keyboard, pointing devices such as a mouse, trackball, touch-pad, or graphics tablet, a scanner, a touchscreen incorporated into the display, audio input devices such as voice recognition systems, microphones, and other types of input devices. In general, an input device may refer to any device or mechanism that may be used for inputting information to system 900. Input devices 908 typically allows a user to select objects, icons, text and the like that appear on a monitor via a command such as a click of a button or the like.

Output devices 910 may include wired or wireless devices such as a display subsystem, a printer, a fax machine, or non-visual displays such as audio output devices, etc. Examples of a display subsystem include a cathode ray tube (CRT), a flat-panel device such as a liquid crystal display (LCD), a projection device, etc. In general, an output device may refer to any device or mechanism for outputting information from system 900. For example, the results of animation and the rendered scenes may be displayed to a user using an output device.

Network interface subsystem 912 provides an interface to other computer systems, servers, and networks. Network interface subsystem 912 serves as an interface for receiving data from other sources and for transmitting data to other sources from system 900. Embodiments of network interface subsystem 912 include an Ethernet card, a modem (telephone, satellite, cable, ISDN, etc.), (asynchronous) digital subscriber line (DSL) units, FireWire interface, USB interface, and the like. For example, subsystem 912 may be coupled to a computer network, to a FireWire bus, or the like. In other embodiments, network interface subsystem 912 may be physically integrated on the motherboard of system 900, and may be a software program, such as soft DSL, or the like.

Memory subsystem 906 may be configured to store the basic programming and data constructs that provide the functionality of the present invention. For example, software code modules (or instructions) implementing the functionality of the present invention may be stored in memory 906. These software modules may be executed by processor(s) 902. Memory 906 may also provide a repository for storing data used in accordance with the present invention. For example, memory 906 may store information 916 related to objects being animated. The animated object information may include geometric description of an animated object, information about position and orientation of an animated object, values for animation variables associated with the animated object, and other object information. Memory 906 may also store information 914 about spatial (path) and timing splines. Memory 906 may also store rendered images 918 that may be displayed via a display device.

Memory 906 may include a number of memories including a main random access memory (RAM) for storage of instructions and data during program execution and a read only memory (ROM) in which fixed instructions are stored. RAM is generally semiconductor-based memory that can be read and written by processor 902. The storage locations can be accessed in any order. RAM is generally understood to refer to volatile memory that can be written to as well as read. There are various different types of RAM. For purposes of this application, references to information being loaded or unloaded from memory refer to loading or unloading the information from RAM (or any other volatile memory used by a program or process during execution) of system 900.

Memory 906 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Processing system 900 can be of various types including a personal computer, a portable computer, a workstation, a network computer, a mainframe, a kiosk, or any other data processing system. Due to the ever-changing nature of computers and networks, the description of system 900 depicted in FIG. 9 is intended only as a specific example for purposes of illustrating the preferred embodiment of a processing system. Many other configurations having more or fewer components than the system depicted in FIG. 9 are possible. For example, the processing system may be a desktop computer, portable computer, rack-mounted or tablet configuration. Additionally, the processing system may be a series of networked computers. Further, the use of different micro processors is contemplated, such as Pentium™ or Itanium™ microprocessors; Opteron™ or AthlonXP™ microprocessors from Advanced Micro Devices, Inc; and the like. Further, use of different types of operating systems is contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure without departing from the broader spirit and scope of the invention as set forth in the claims. The scope of the invention should, therefore, be determined not with reference to the above description, but instead should be determined with reference to the pending claims along with their full scope or equivalents.

What is claimed is:

1. A method of animating an object, the method comprising:
    receiving information identifying a plurality of animation variables that are coupled;
    receiving a first set of knots defined for one or more animation variables in the plurality of animation variables, each knot for an animation variable in the first set of knots identifying a time point and a value for the animation variable at that time point; and
    generating a second set of knots for the plurality of animation variables based upon the first set of knots;
    for at least one animation variable in the plurality of animation variables, generating, based upon the first set of knots and the second set of knots, a value for the at least one animation variable at a time point at which no knot exists for the at least one animation variable in the first set of knots or the second set of knots;
    rendering the object on an output device using the plurality of animation variables;
    generating a path based upon the first set of knots and the second set of knots; and
    generating a timing spline for the path, the timing spline comprising a knot for each control-point in the set of control-points, each knot of the timing spline identifying a time point and an indication of distance traveled along the path at that time point.

2. The method of claim 1 wherein the plurality of animation variables comprises animation variables used for determining a position and an orientation for the object.

3. The method of claim 1 wherein the generating the second set of knots comprises:
    for each knot in the first set of knots defined for an animation variable in the plurality of animation variables,
        generating a knot for each other animation variable in the plurality of animation variables, the generated knot for an animation variable identifying a value for the animation variable at a time point associated with the each knot.

4. The method of claim 1 wherein at least one knot in the first set of knots is specified by a user or using a procedural technique.

5. The method of claim 1 wherein determining a value for the at least one animation variable comprises determining the value by evaluating the path.

6. The method of claim 1 wherein generating the path comprises:
    determining a set of control-points for time points associated with knots for the plurality of animation variables, wherein a control-point for a time point is defined by the values of the plurality of variables at that time point; and
    determining the path based upon the set of control-points.

7. The method of claim 1 wherein generating a value for the at least one animation variable at a time point at which no knot exists for the at least one animation variable in the first set of knots or the second set of knots comprises evaluating the path using the timing spline.

8. The method of claim 1 further comprising:
    receiving a signal indicating deletion of at least one knot in the timing spline;
    regenerate the timing spline without the deleted knot;
    determining a control-point in the path defined by values of animation variables in the plurality of animation variables associated with the deleted knot; and
    determining a time point for the control-point based upon the regenerated timing spline.

9. The method of claim 8 further comprising recalculating a value for the at least one animation variable at a time point at which no knot exists for the at least one animation variable in the first set of knots or the second set of knots using the regenerated timing spline.

10. The method of claim 1 further comprising:
    receiving a signal indicating insertion of a timing knot in the timing spline, the timing knot identifying a time point and an indication of distance traveled along the path at that time point;
    regenerating the timing spline using the timing knot; and
    recalculating a value for the at least one animation variable at a time point at which no knot exists for the at least one animation variable in the first set of knots or the second set of knots using the regenerated timing spline.

11. The method of claim 1 wherein the generating the second set of knots based upon the first set of knots is performed only in a first mode of operation and not performed in a second mode of operation.

12. A system for animating an object, the system comprising:

a memory configured to store a plurality of animation variables that are coupled and a first set of knots defined for one or more animation variables in the plurality of animation variables, each knot for an animation variable in the first set of knots identifying a time point and a value for the animation variable at that time point; and a processor coupled to the memory, the processor adapted to:

generate a second set of knots for the plurality of animation variables based upon the first set of knots;

for at least one animation variable in the plurality of animation variables, generate, based upon the first set of knots and the second set of knots, a value for the at least one animation variable at a time point at which no knot exists for the at least one animation variable in the first set of knots or the second set of knots; and rendering the object on an output device using the plurality of animation variables, wherein the processor is adapted to determine the value for the at least one animation variable by evaluating the path; and wherein the processor is adapted to generate a timing spline for the path, the timing spline comprising a knot for each control-point in the set of control-points, each knot of the timing spline identifying a time point and an indication of distance traveled along the path at that time point.

13. The system of claim 12 wherein the plurality of animation variables comprises animation variables used for determining a position and an orientation for the object.

14. The system of claim 12 wherein the processor is adapted to, for each knot in the first set of knots defined for an animation variable in the plurality of animation variables, generate a knot for each other animation variable in the plurality of animation variables, the generated knot for an animation variable identifying a value for the animation variable at a time point associated with the each knot.

15. The system of claim 12 wherein at least one knot in the first set of knots is specified by a user or using a procedural technique.

16. The system of claim 12 wherein the processor is adapted to determine the value for the at least one animation variable by evaluating the path.

17. The system of claim 12 wherein the processor is adapted to:

determine a set of control-points for time points associated with knots for the plurality of animation variables, wherein a control-point for a time point is defined by the values of the plurality of variables at that time point; and determine the path based upon the set of control-points.

18. The system of claim 12 wherein the processor is adapted to generate a value for the at least one animation variable at a time point at which no knot exists for the at least one animation variable in the first set of knots or the second set of knots by evaluating the path using the timing spline.

19. The system of claim 12 wherein the processor is adapted to:

receive a signal indicating deletion of at least one knot in the timing spline;

regenerate the timing spline without the deleted knot;

determine a control-point in the path defined by values of animation variables in the plurality of animation variables associated with the deleted knot; and determine a time point for the control-point based upon the regenerated timing spline.

20. The system of claim 19 wherein the processor is adapted to recalculate a value for the at least one animation variable at a time point at which no knot exists for the at least one animation variable in the first set of knots or the second set of knots using the regenerated timing spline.

21. The system of claim 12 wherein the processor is adapted to:

receive a signal indicating insertion of a timing knot in the timing spline, the timing knot identifying a time point and an indication of distance traveled along the path at that time point;

regenerate the timing spline using the timing knot; and recalculate a value for the at least one animation variable at a time point at which no knot exists for the at least one animation variable in the first set of knots or the second set of knots using the regenerated timing spline.

22. The system of claim 12 wherein the processor is adapted to generate the second set of knots based upon the first set of knots only in a first mode of operation and not a second mode of operation.

23. A non-transitory computer-readable medium storing a plurality of instructions for controlling a data processor to animate an object, the plurality of instructions comprising:

instructions that cause the data processor to receive information identifying a plurality of animation variables that are coupled;

instructions that cause the data processor to receive a first set of knots defined for one or more animation variables in the plurality of animation variables, each knot for an animation variable in the first set of knots identifying a time point and a value for the animation variable at that time point; and instructions that cause the data processor to generate a second set of knots for the plurality of animation variables based upon the first set of knots;

instructions that cause the data processor to, for at least one animation variable in the plurality of animation variables, generate, based upon the first set of knots and the second set of knots, a value for the at least one animation variable at a time point at which no knot exists for the at least one animation variable in the first set of knots or the second set of knots; and instructions that cause the data processor to render the object on an output device using the plurality of animation variables wherein the plurality of instructions further comprises instructions that cause the data processor to generate a path based upon the first set of knots and the second set of knots; and wherein the plurality of instructions further comprises instructions that cause the data processor to generate a timing spline for the path, the timing spline comprising a knot for each control-point in the set of control-points, each knot of the timing spline identifying a time point and an indication of distance traveled along the path at that time point.

24. The non-transitory computer-readable medium of claim 23 wherein the plurality of animation variables comprises animation variables used for determining a position and an orientation for the object.

25. The non-transitory computer-readable medium of claim 23 wherein the instructions that cause the data processor to the generate the second set of knots comprises:

for each knot in the first set of knots defined for an animation variable in the plurality of animation variables, instructions that cause the data processor to generate a knot for each other animation variable in the plurality of animation variables, the generated knot for an animation variable identifying a value for the animation variable at a time point associated with the each knot.

26. The non-transitory computer-readable medium of claim 23 wherein at least one knot in the first set of knots is specified by a user or using a procedural technique.

27. The non-transitory computer-readable medium of claim 23 wherein the instructions that cause the data processor to determine a value for the at least one animation variable comprise instructions that cause the data processor to determine the value by evaluating the path.

28. The non-transitory computer-readable medium of claim 23 wherein the instructions that cause the data processor to generate the path comprise:
   instructions that cause the data processor to determine a set of control-points for time points associated with knots for the plurality of animation variables, wherein a control-point for a time point is defined by the values of the plurality of variables at that time point; and
   instructions that cause the data processor to determine the path based upon the set of control-points.

29. The non-transitory computer-readable medium of claim 23 wherein the instructions that cause the data processor to generate a value for the at least one animation variable at a time point at which no knot exists for the at least one animation variable in the first set of knots or the second set of knots comprises instructions that cause the data processor to evaluate the path using the timing spline.

30. The non-transitory computer-readable medium of claim 23 wherein the plurality of instructions further comprises instructions that cause the data processor to:
   receive a signal indicating deletion of at least one knot in the timing spline;
   regenerate the timing spline without the deleted knot;
   determine a control-point in the path defined by values of animation variables in the plurality of animation variables associated with the deleted knot; and
   determining a time point for the control-point based upon the regenerated timing spline.

31. The non-transitory computer-readable medium of claim 30 wherein the plurality of instructions further comprises instructions that cause the data processor to recalculate a value for the at least one animation variable at a time point at which no knot exists for the at least one animation variable in the first set of knots or the second set of knots using the regenerated timing spline.

32. The non-transitory computer-readable medium of claim 23 wherein the plurality of instructions further comprises instructions that cause the data processor to:
   receive a signal indicating insertion of a timing knot in the timing spline, the timing knot identifying a time point and an indication of distance traveled along the path at that time point;
   regenerate the timing spline using the timing knot; and
   recalculate a value for the at least one animation variable at a time point at which no knot exists for the at least one animation variable in the first set of knots or the second set of knots using the regenerated timing spline.

33. The non-transitory computer-readable medium of claim 23 wherein the plurality of instructions further comprises instructions that cause the data processor to generate the second set of knots based upon the first set of knots only in a first mode of operation and not in a second mode of operation.

* * * * *